(12) United States Patent
Jha et al.

(10) Patent No.: US 12,167,271 B2
(45) Date of Patent: Dec. 10, 2024

(54) METHODS AND SYSTEMS FOR MAXIMIZING THROUGHPUT FOR A DEVICE OPERATING IN MULTI-RAT MODE

(71) Applicant: Samsung Electronics Co., Ltd., Suwon-si (KR)

(72) Inventors: Kailash Kumar Jha, Bangalore (IN); Abhishek Kaswan, Bangalore (IN); Alok Kumar Jangid, Bangalore (IN); Nishant, Bangalore (IN); Sidhant Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/503,129

(22) Filed: Oct. 15, 2021

(65) Prior Publication Data

US 2022/0124544 A1    Apr. 21, 2022

Related U.S. Application Data

(63) Continuation of application No. PCT/KR2021/014270, filed on Oct. 14, 2021.

(30) Foreign Application Priority Data

Oct. 16, 2020  (IN) .............................. 202041045219
Apr. 15, 2021  (IN) .............................. 202041045219

(51) Int. Cl.
*H04W 28/02* (2009.01)
*H04B 7/0413* (2017.01)
(Continued)

(52) U.S. Cl.
CPC ...... *H04W 28/0215* (2013.01); *H04B 7/0413* (2013.01); *H04L 5/14* (2013.01);
(Continued)

(58) Field of Classification Search
None
See application file for complete search history.

(56) References Cited

U.S. PATENT DOCUMENTS

| 10,237,841 | B1 | 3/2019 | Krishnamurthy et al. |
| 2010/0216469 | A1 | 8/2010 | Yi et al. |

(Continued)

FOREIGN PATENT DOCUMENTS

| KR | 10-2009-0045039 A | 5/2009 |
| KR | 10-2012-0115946 A | 10/2012 |

(Continued)

OTHER PUBLICATIONS

International Search Report and Written Opinion of the International Searching Authority in connection with International Application No. PCT/KR2021/014270 issued Jan. 17, 2022, 8 pages.

(Continued)

*Primary Examiner* — Diane L Lo

(57) ABSTRACT

In an embodiment, a method for selecting a frequency combination for a User Equipment (UE), is disclosed. The method includes determining, by the UE, at least one of a bandwidth or multiple-input multiple-output (MIMO) layer information associated with each of a plurality of cells upon detecting the plurality of cells present in a network. The method includes identifying, by the UE, at least one combination of cells amongst the plurality of cells providing a maximum throughput based on the determined bandwidth and the MIMO layer information associated with each of the plurality of cells. The method further includes latching, by the UE, onto the combination of cells with the maximum throughput.

19 Claims, 10 Drawing Sheets

(51) Int. Cl.
  *H04L 5/14* (2006.01)
  *H04W 24/10* (2009.01)
  *H04W 36/00* (2009.01)
  *H04W 76/10* (2018.01)
  *H04W 88/06* (2009.01)

(52) U.S. Cl.
  CPC .......... *H04W 76/10* (2018.02); *H04W 88/06* (2013.01); *H04W 24/10* (2013.01); *H04W 36/00692* (2023.05)

(56) References Cited

U.S. PATENT DOCUMENTS

| | | |
|---|---|---|
| 2012/0258750 A1 | 10/2012 | Kim et al. |
| 2014/0244001 A1 | 8/2014 | Glickfield et al. |
| 2014/0348017 A1* | 11/2014 | Zhu .................... H04B 7/0689 370/252 |
| 2016/0212658 A1 | 7/2016 | Ahmadi |
| 2018/0139669 A1 | 5/2018 | Jung et al. |
| 2018/0343697 A1* | 11/2018 | Hsu .................... H04W 76/16 |
| 2019/0052328 A1 | 2/2019 | Akula et al. |
| 2020/0221290 A1* | 7/2020 | Wiemann .................... H04W 8/24 |
| 2020/0260265 A1 | 8/2020 | Jin et al. |
| 2020/0286368 A1 | 9/2020 | Trupp |
| 2021/0410013 A1* | 12/2021 | Yang .................... H04L 47/805 |
| 2022/0303844 A1* | 9/2022 | Viering ............. H04W 36/0083 |

FOREIGN PATENT DOCUMENTS

| | | |
|---|---|---|
| KR | 10-1895989 B1 | 9/2018 |
| KR | 10-2020-0099001 A | 8/2020 |
| WO | 2014186062 A1 | 11/2014 |
| WO | 2016/163824 A1 | 10/2016 |
| WO | 2019032908 A1 | 2/2019 |
| WO | 2020193789 A1 | 10/2020 |

OTHER PUBLICATIONS

Examination report dated Jun. 6, 2022, in connection with Indian Application No. 202041045219, 6 pages.
Supplementary European Search Report dated Sep. 27, 2023, in connection with European Patent Application No. 21880554.7, 11 pages.
Huawei et al., "Discussion on NR Rel-16 UE demodulation requirements for CA," R4-1909853, 3GPP TSG-RAN WG4 Meeting #92, Ljubljana, Slovenia, Aug. 26-30, 2019, 9 pages.
NTT Docomo, "Way Forward On SDR Requirements," R4-1904755, 3GPP TSG-RAN WG4 Meeting #90bis, Xi'an, China, Agenda Item: 6.12.1.2, Apr. 8-12, 2018, 13 pages.

* cited by examiner

METHODS AND SYSTEMS FOR MAXIMIZING THROUGHPUT FOR A DEVICE OPERATING IN MULTI-RAT MODE

CROSS-REFERENCE TO RELATED APPLICATIONS

This application is a continuation application, claiming priority under § 365(c), of an International application No. PCT/KR2021/014270, filed on Oct. 14, 2021, which is based on and claims the benefit of an Indian provisional patent application number 202041045219, filed on Oct. 16, 2020, in the Indian Patent Office, and of an Indian Complete patent application number 202041045219, filed on Apr. 15, 2021, in the Indian Patent Office, the disclosure of each of which is incorporated by reference herein in its entirety.

BACKGROUND

1. Field

The present disclosure, in general, relates to network procedures performed by User Equipment (UE), and, in particular, relates to network procedures performed by a UE operating in the multi-radio access technology (RAT) mode.

2. Description of Related Art

With the advancement and evolution of wireless network technologies, such as long term evolution (LTE) (4G) and new radio (NR) (5G), devices (such as UEs) capable of operation in multi-RAT and multi-carrier modes indicate the supported bands and combinations along with different radio capabilities to the network through a UECapabilityInformation message. Different information elements such as SupportedBandEUTRA, supportedBandCombination, MIMOCapabilityDL in the UECapabilityInformation message indicate bands, combinations and MIMO capabilities of the UE. Based on these pieces of capability information, network decides whether to configure carrier aggregation or dual connectivity in the device along with the supported layers in certain bands. Basically, the throughput achieved by the device is dependent on how the network configures the device based on the information received in the UECapabilityInformation message. The capability information exchange is usually performed at the time of the attach procedure, or when the network inquires after handover.

The 3GPP specification (TS 24.301) provides another method of updating UE capability information using the tracking area update procedure. If a UE wants to update or modify its radio capabilities with the network, then in a tracking area update (TAU) request message, the UE can set a flag corresponding to "UE radio capability information update needed flag", based on which UE capability information can be updated. When a UE reports that a capability update is required in a TAU request, then the network (which may be interchangeably referred to as an "NW") will inquire about the UE radio capabilities, based on which the UE will send the updated UE capability information to the network in a UECapabilityInformation message.

Networks deploy cells of different bandwidths based on the spectrum available to them in different bands in a region. Spectrum generally is scarce resource, even more so in the case of lower spectrum bands, for which multiple operators are in competition due to their properties of higher range and better penetration through walls and obstacles. (Lower spectrum bands use lower frequencies, and as a result, cells deployed in these bands have higher range, better coverage, and better signal penetration through walls or obstacles.). This results in a limited availability of bandwidth for each operator, or sometimes results in availability of bandwidth in chunks rather than in a continuous range of frequencies. Mobile devices, on the other hand, cannot support multiple layers for some bands due to limited availability of space for multiple antennas, or may sometimes not support some bands at all. At a given point in time, the network schedules a certain number of resource blocks (which basically translate to bandwidth) based on the number of users in the cell.

Thus, there is a need for a solution that overcomes the above deficiencies.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The present disclosure refers to a method for selecting a frequency combination for a User Equipment (UE). The method includes determining, by the UE, at least one of a bandwidth information or multiple-input multiple-output (MIMO) layer information associated with each of a plurality of cells upon detecting the plurality of cells present in a network. The method includes identifying, by the UE, at least one combination of cells among the plurality of cells that provides a maximum throughput based on the at least one of the bandwidth information or the MIMO layer information associated with each of the plurality of cells. The method further includes connecting, by the UE, to the combination of cells that provides the maximum throughput.

The present disclosure refers to a system selecting a frequency combination for a User Equipment (UE). The system includes a controller configured to determine at least one of a bandwidth information or a multiple-input multiple-output (MIMO) layer information associated with each of a plurality of cells upon detecting the plurality of cells present in a network. The controller is further configured to identify at least one combination of cells among the plurality of cells that provides a maximum throughput based on the at least one of the bandwidth information or the MIMO layer information associated with each of the plurality of cells. The controller is further configured to connect to the combination of cells that provides the maximum throughput.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
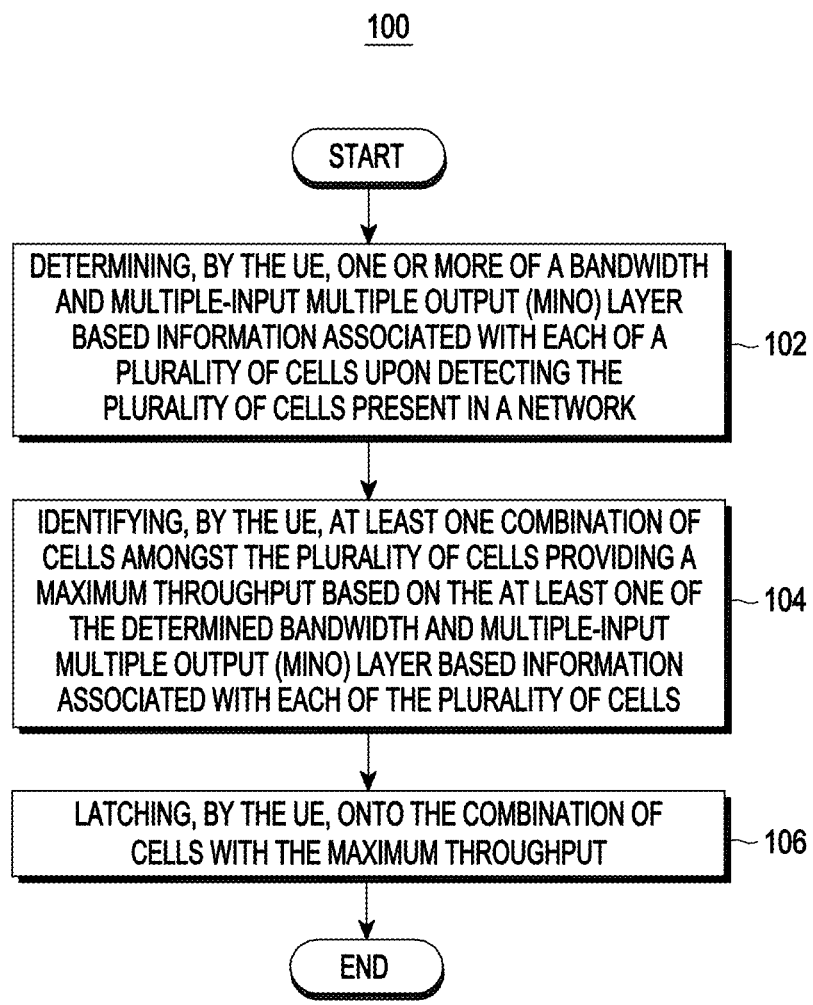
FIG. 1 illustrates a method, implemented in a User Equipment (UE) for selecting a frequency combination for the UE in a multi-carrier connected mode in 4G and 5 GRATs, in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 illustrates a method 100 for selecting a frequency combination for a user equipment (UE) in a multi-carrier connected mode in 4G (e.g., LTE) and 5G (e.g., NR) RATs, in accordance with an embodiment of the present disclosure. In an example, the method 100 may be implemented in the UE. The UE may be configured to operate in E-UTRAN New Radio-Dual Connectivity (EN-DC) mode. In an embodiment, the UE may be configured to detect a bandwidth associated with a plurality of cells present in a network in order to select a frequency combination for the UE in the multi-carrier connected mode in the 4G and the 5G RATs.

At step 102, the method 100 includes determining, by the UE, at least one of a bandwidth information or multiple-input multiple output (MIMO) layer information associated with each of a plurality of cells upon detecting the plurality of cells present in a network. For example, the bandwidth information associated with a cell may indicate the bandwidth of a frequency band used in the cell, and the MIMO layer information associated with the cell may indicate the number of MIMO layers supported by the UE in the frequency band.

At step 104, the method 100 includes identifying, by the UE, at least one combination of cells among the plurality of cells in the network that provides a maximum throughput, based on the at least one of the determined bandwidth or the MIMO layer information associated with each of the plurality of cells. In an embodiment, the method 100 includes, upon failing to determine the at least one combination of cells that provides the maximum throughput, determining another combination of cells among the plurality of cells that provides a throughput less than the maximum throughput (e.g., a combination of cells that provides a next best throughput). In some embodiments, for determination of such a next best combination, a ranking of the various possible combinations of cells is prepared, and the best (e.g., highest ranked combination) is selected. If there is failure to connect to any one cell from the best combination, then the immediately next highest ranked combination is selected.

In an embodiment, the UE may be configured to scan a number of combinations of the plurality of cells including the at least one combination of the cells that provides the maximum throughput and the other combination of cells that provides a throughput less than the maximum throughput. In an embodiment, the scanning may be performed based on a throughput related to each combination among the number of combination.

At step 106, the method 100 includes latching, by the UE, onto (or connecting to) the combination of cells with the maximum throughput.

Figure 2:
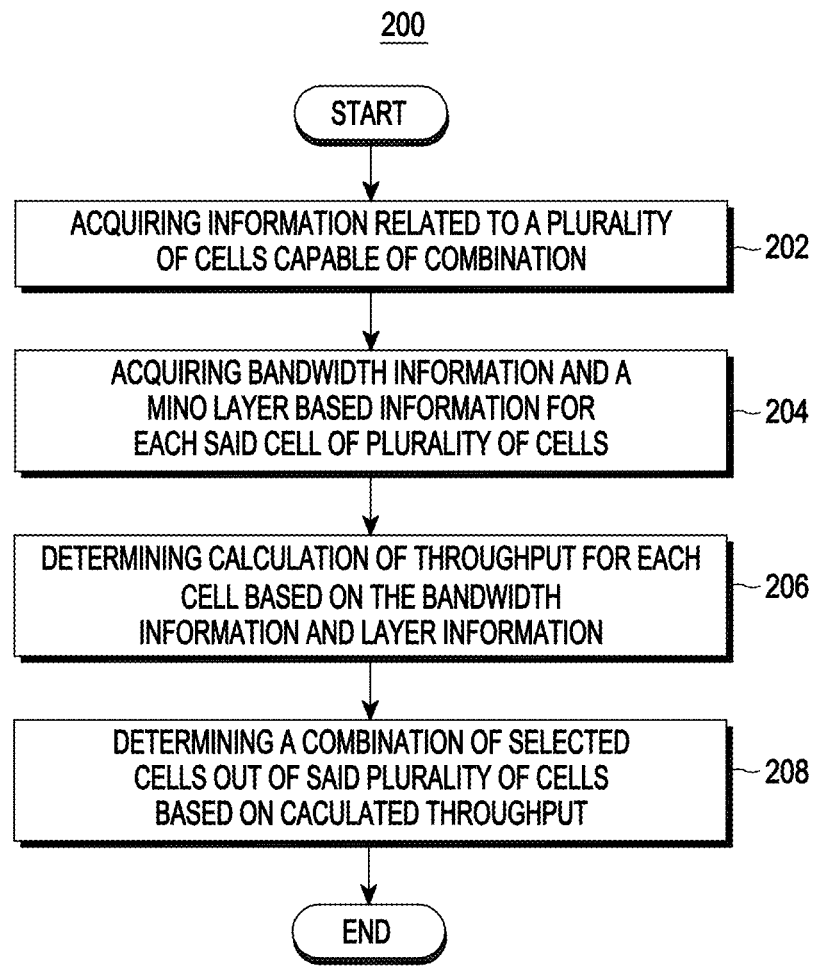
FIG. 2 illustrates a method, implemented in a User Equipment (UE) for selecting a frequency combination for the UE in a multi-carrier connected mode in 4G and 5 GRATs, in accordance with an embodiment of the present disclosure.

FIG. 2 illustrates a method 200, implemented in a User Equipment (UE) for selecting a frequency combination of the UE in a multi-carrier connected mode in 4G and 5G RATs, in accordance with an embodiment of the present disclosure. In an example, the method 200 may be implemented in the UE.

At step 202, the method 200 includes acquiring information related to a plurality of cells in a network that are capable of combination in a multi-carrier mode.

At step 204, the method 200 includes acquiring bandwidth information and MIMO layer information for each cell of plurality of cells.

At step 206, the method 200 includes determining a calculation of throughput for each cell based on the bandwidth information and the MIMO layer information.

At step 208, the method 200 includes determining a selected combination of cells among the plurality of cells based on the calculated throughput.

In an embodiment, acquiring the bandwidth information may be performed based on determining that the network is configuring the UE to add an NR cell to a multi-carrier mode (e.g., EN-DC) combination of cells (e.g., by configuring the UE to perform B1 measurements on the NR cell). In an embodiment, the NR cell may be among the plurality of cells present in the network. In an embodiment, the UE configured by the network may be operating on maximum component carriers. Moving forward, in response to determining that the network is configuring the UE to use the NR cell, the method 200 may include determining a bandwidth associated with the NR cell from among the plurality of cells being measured by the network.

In an embodiment, the UE may be previously configured to include an LTE cell in a multi-carrier mode (e.g., LTE-CA) combination of cells. In an embodiment, the method 200 may include comparing the bandwidth associated with the NR cell with a bandwidth associated with the LTE cell previously configured to the UE. For example, the bandwidth associated with the NR cell could be a bandwidth of an NR band used by the NR cell, and the bandwidth associated with the LTE cell could be a bandwidth of an LTE band used by the LTE cell.

In an embodiment, the method 200 may include determining a result of adding the NR cell to the combination of cells in place of the LTE cell (e.g., whether total bandwidth would be increased or decreased by adding the NR cell and removing the LTE cell). Moving forward, in an embodiment, where it is determined that the addition of the NR cell in place of the LTE cell would result in a higher total bandwidth and the maximum throughput, the method 200 may send a B1 measurement associated with the NR cell to the network. In an embodiment, the UE may be configured to transfer the data in an EN-DC mode upon addition of the NR cell. In another embodiment, where it is determined that the addition of the NR cell in place of the LTE cell would result in a lower total bandwidth and a lower throughput, the method 200 may not send the B1 measurement associated with the NR cell to the network, and may continue operation with the previously configured combination of cells.

In an embodiment, the UE may be previously configured to include an NR cell in a multi-carrier mode (e.g., EN-DC) combination of cells. In an embodiment, the method 200 may include determining that an LTE cell is available in the network. The method 200 may include comparing the bandwidth associated with the previously configured NR cell with a bandwidth associated with the LTE cell that is available. In an embodiment, the method 200 may include determining a result of adding the LTE cell to the combination of cells (e.g., whether total bandwidth would be increased or decreased by adding the LTE cell). This may include comparing the bandwidth associated with the LTE cell with the bandwidth associated with the NR cell. In an embodiment, where it is determined that the addition of the LTE cell would result in a higher total bandwidth (e.g., it is determined that the bandwidth associated with the NR cell is less than the bandwidth associated with the LTE cell), the method 200 may include sending a SCGFailureInfo message to the network for removal of the NR cell from the combination of cells. In an embodiment, the SCGFailureInfo message may be sent by the UE to the network.

In an embodiment, a measurement event is configured by the network for modification or replacement of one or more previously added cells in the combination of cells. In an embodiment, the measurement event may be a measurement event A6. In an embodiment, the one or more previously added cells may include an LTE cell. Continuing with the above embodiment, the method 200 may be configured to determine a bandwidth associated with a cell from the plurality of cells that is configured to be measured by the measurement event. Moving forward, the method 200 may include comparing the bandwidth associated with the cell with a bandwidth of the one or more previously added cells.

In an embodiment, the method 200 may include determining a result of adding the cell to the combination of cells in place of one of the previously added cells (e.g., whether a total bandwidth would be increased or decreased by adding the NR cell). Moving forward, in an embodiment, where it is determined that the addition of the cell would result in a higher total bandwidth and a higher throughput than that provided by the previously configured combination of cells, the method 200 may be configured to send a measurement associated with the cell to the network. In another embodiment, where it is determined that the addition of the cell would result in a lower total bandwidth and the lower throughput than that provided by the previously configured combination of cells (i.e., in comparison to the maximum throughput provided by possible combinations of cells), the method 200 may continue operation with the previously configured combination of cells.

In an embodiment, the UE may be operating in one of an LTE-Cell Aggregation (CA) mode or an E-UTRAN New Radio-Dual Connectivity (EN-DC) mode. Further, the UE may be configured with the maximum number of MIMO layers. Continuing with above embodiment, the method 200 may include determining that there are more MIMO layers assigned to a cell in the previously configured combination of cells that has a lower bandwidth than there are MIMO layers assigned to a cell in the previously configured combination of cells that has a higher bandwidth. In an embodiment, the determination may be performed by the UE. Moving forward, the method 200 may include sending a Channel Status Information (CSI) report to the network.

In an embodiment, the CSI report may be sent by the UE. Further, the CSI report may report the cell with the lower bandwidth at a lower Rank Index (RI) and the cell with the higher bandwidth at a higher RI. Continuing with above embodiment, the network may be configured to increase the MIMO layers assigned to the cell with the higher bandwidth and decrease the MIMO layers assigned to the cell with the lower bandwidth.

Moving forward, in an embodiment, the UE may be operating in an LTE mode and transferring data to the network. Continuing with this embodiment, the method 200 may include configuring an NR measurement for addition of an NR cell to a combination of cells for operation in EN-DC mode. In an embodiment, the configuration may be performed by the network. Further, the method 200 may include determining whether the NR measurement is configured for one or more Time Division Duplex (TDD) NR bands and one or more Frequency Division Duplex (FDD) NR bands. In an embodiment, the determining may be performed by the UE.

Continuing with the above embodiment, the method 200 may include sending, by the UE, a measurement report to the network for the one or more TDD bands. In an embodiment, the measurement report may be sent by the UE. Furthermore, the measurement report may be sent upon determining that the NR measurement is configured for the one or more TDD bands and the one or more FDD bands. In an embodiment, the determination may be performed by the UE. Upon receiving the measurement report, the network may be configured to add an NR cell associated with the one or more TDD bands to the combination of cells configured to the UE. That is, the network may configure the UE to add the NR cell associated with the one or more TDD bands to the combination of cells configured to the UE.

In an embodiment, the UE may be operating in an NR-EUTRA Dual Connectivity (NE-DC) mode. Continuing with this embodiment, the method 200 may include determining one or more EN-DC mode combinations of the plurality of cells. In an embodiment, the determination may be performed by the UE by reading a "SystemInformationBlockType26a". In an embodiment, the "SystemInformationBlockType26a" may be an information block associated with a neighboring LTE cell among the plurality of cells.

In an embodiment, the "SystemInformationBlockType26a" may include an NR band list associated with the EN-DC operation (e.g., an NR band list for which EN-DC operation is possible). Moving forward, the method 200 may include determining that one or more EN-DC band combinations have a higher total bandwidth than a previous NE-DC band combination. In an embodiment, the determination may be performed by the UE.

Continuing with the above embodiment, the method 200 may include performing one or more of sending, to the network, a measurement report for an inter-RAT handover to move to an LTE mode, or camping on an LTE cell among the plurality of cells that supports the higher bandwidth band combination by performing a RRC Connection Reestablishment (RRE) if a handover is not performed by the network. In an embodiment, the measurement report may be sent by the UE and the UE may camp on the LTE cell.

In an embodiment, information related to a combination of cells configured by the network may be transmitted to the UE. In an embodiment, upon receiving the information related to the combination of cells configured by the network, the UE may be configured to determine that the combination of cells configured by the network is unable to provide the maximum throughput. Upon determining the inability of the combination of cells to provide the maximum throughput, the UE may be configured to send a Tracking Area Update (TAU) request to the network for indicating an update of UE capability information. In an embodiment, the TAU request may include a flag set to "UE radio capability information update needed flag" by the UE. In response to sending the TAU request to the network, the UE may be configured to receive an inquiry associated with a UE CA capability from the network. Upon receiving the inquiry, the UE may be configured to process the inquiry and send updated UE capability information to the network. In an embodiment, the updated UE capability information may include reduced MIMO capabilities on a band that supports a lower bandwidth than another available band among bands of the combination of cells configured by the network, removing support for EN-DC, and removing support for the band that supports the lower bandwidth. In an embodiment, the method 200 may include acquiring duplexing mode information for each cell and determining the combination of cells based on duplexing mode information.

Figure 3:
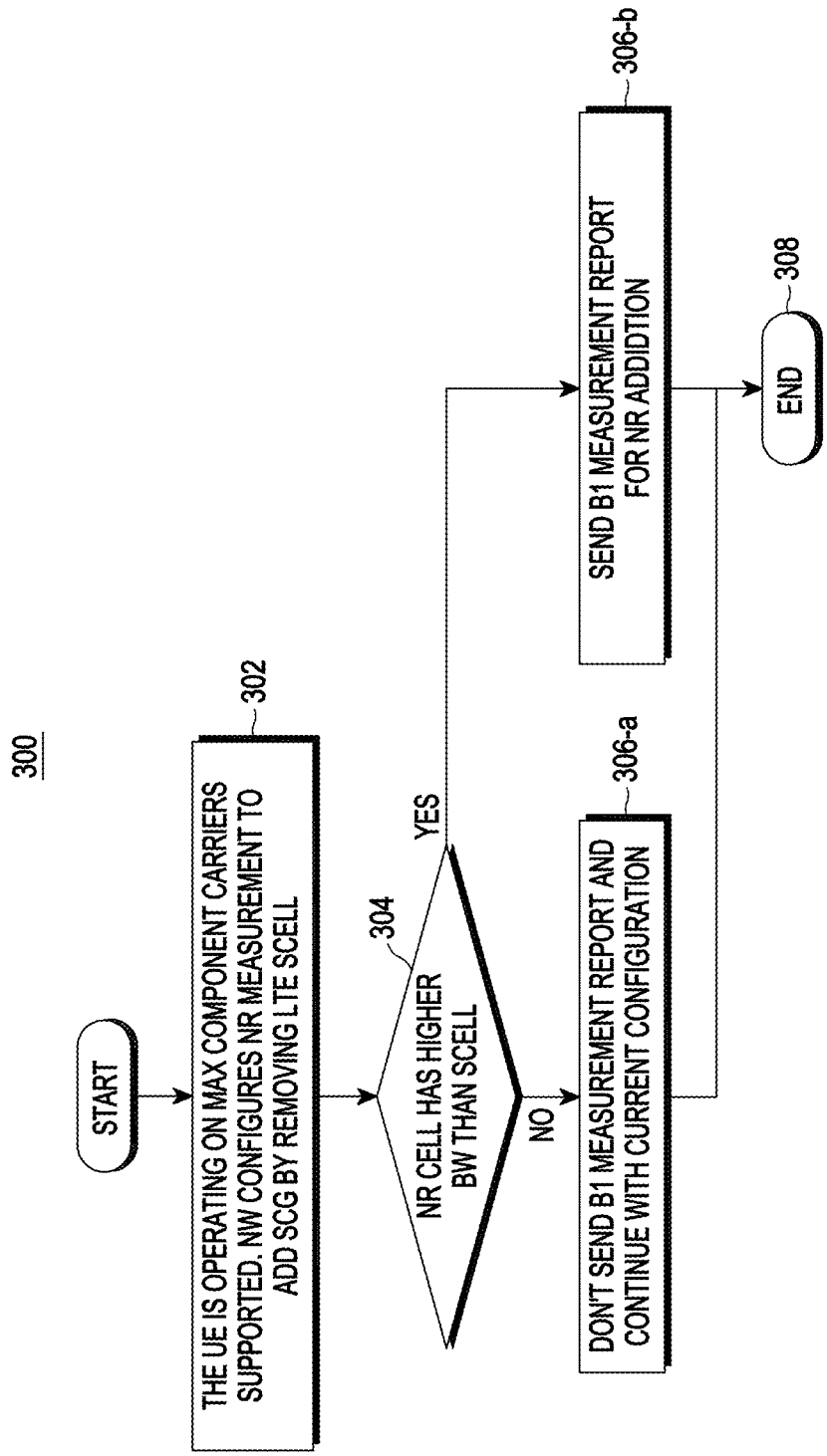
FIG. 3 illustrates an operational flow diagram depicting a process for selecting a combination of cells for higher throughput, in accordance with an embodiment of the present disclosure.

FIG. 3 illustrates an operational flow diagram 300 depicting a process for selecting a combination of cells for higher throughput, in accordance with embodiments of the present disclosure. The higher throughput may be related to transferring data from a UE to the network. In an embodiment, the UE may transfer data to the network in an LTE 3CA mode, and the UE may be operating on maximum component carriers. In an embodiment, the combination of cells may be selected from a plurality of cells present in the network and at least one LTE cell previously added to the combination of cells (i.e., at least one LTE cell configured for CA in the UE). In an embodiment, selecting the combination of cells may include avoiding addition of an NR cell to the combination of cells at the UE. In an embodiment, the NR cell may be an NR cell among the plurality of cells present in the network. In an embodiment, the addition of the NR cell may be avoided by not sending a B1 measurement report from the UE to the network. Further, the NR cell may be added by the network and may require removal of the previously added LTE cell.

$$LTE - CA$$
$$CA\_b1 - b5 - b66 \quad = 438 \ Mbps$$
$$BW = 20 + 20 + 20 \ MHz$$

$$EN - DC$$
$$DC\_b1 - b5 - n71 \quad = 374 \ Mbps$$
$$BW = 20 + 20 + 10 \ MHz$$

At step 302, the process may include configuring, by the network, the UE with B1 measurements for addition of an NR cell, and removal of the LTE cell, for EN-DC mode operation. In an embodiment, UE may read a SystemInformationBlockTypexy to obtain an NR list for the EN-DC.

At step 304, the process may include determining, by the UE, a bandwidth of an NR cell being measured. Further, the UE may be configured to compare the determined bandwidth of the NR cell with a bandwidth of the LTE cell previously configured to be in the combination of cells. In an embodiment, more than one LTE cell may be configured to be in the combination of cells of the UE previously. Upon comparing, the process may proceed towards one of step 306-*a*, or step 306-*b*.

At step 306-*a*, the process includes avoiding sending the B1 measurement report upon determining that the previously configured LTE cells in the combination of cells have a higher bandwidth in comparison to the NR cell, and adding the NR cell to the combination of cells in place of one of the LTE cells may result in a lower overall throughput.

At step 306-*b*, the process includes sending the B1 measurement report to the network upon determining that the previously configured LTE cells in the combination of cells include a cell that has a lower bandwidth in comparison to the NR cell, and adding the NR cell to the combination of cells in place of one of the LTE cells may result in higher overall throughput.

At step 308, the process may terminate.

Figure 4:
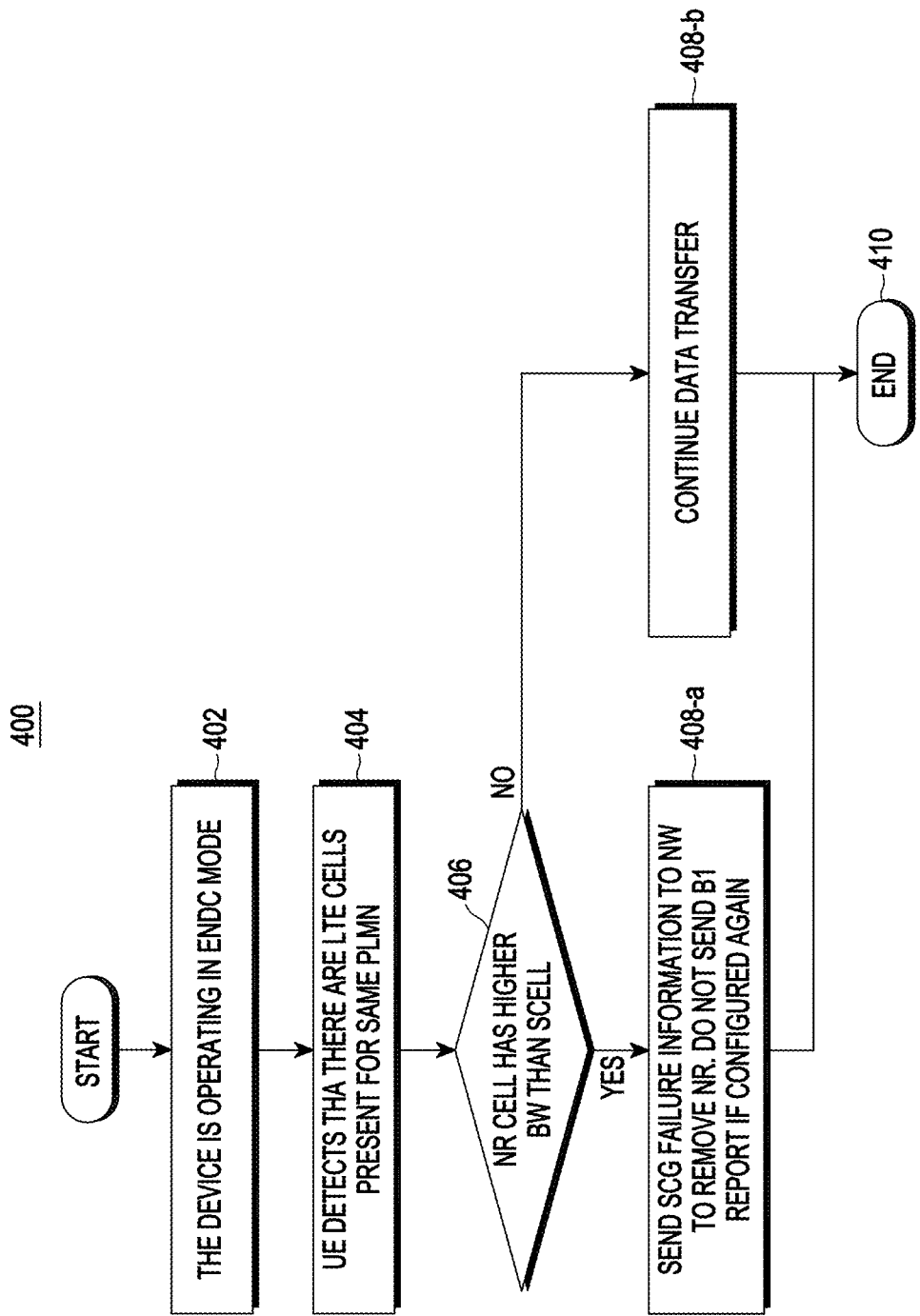
FIG. 4 illustrates an operational flow diagram depicting a process for selecting a combination of cells for higher throughput, in accordance with an embodiment of the present disclosure.

FIG. 4 illustrates an operational flow diagram 400 depicting a process for selecting a combination of cells for higher throughput, in accordance with an embodiment of the present disclosure. In an example, the higher throughput may be related to data transfer between a UE and a network and the data may be transferred in an EN-DC mode.

$$EN - DC$$
$$DC\_b1 - b5 - n78 \quad = 456 \ Mbps$$
$$BW = 20 + 20 + 20 \ MHz$$

$$LTE - CA$$
$$CA\_b1 - b5 - b66 \quad = 365 \ Mbps$$
$$BW = 20 + 20 + 10 \ MHz$$

At step 402, the process includes determining if the UE is operating in an EN-DC mode.

At step 404, the UE detects presence of LTE cells available in the same PLMN.

At step 406, the process includes comparing a bandwidth of an NR cell (in the secondary cell group (SCG) of the EN-DC combination of cells) and a bandwidth of an available LTE band.

At step 408-*a*, the process includes declaring an SCG Failure and indicating the SCG failure to the network in an SCGFailureInfo message, such that an NR cell is removed from the combination of cells (e.g., the SCG), upon determining that the NR cell has a lower bandwidth than the LTE cell. If the network reconfigures a B1 measurement report for SCG addition of the NR cell again, the UE may ignore the B1 measurement and avoid sending the B1 measurement report to avoid the SCG addition.

At step 408-*b*, the process includes sending the B1 measurement report upon determining that the NR cell has a higher bandwidth than the LTE cell.

At step 410, the process may terminate.

Figure 5:
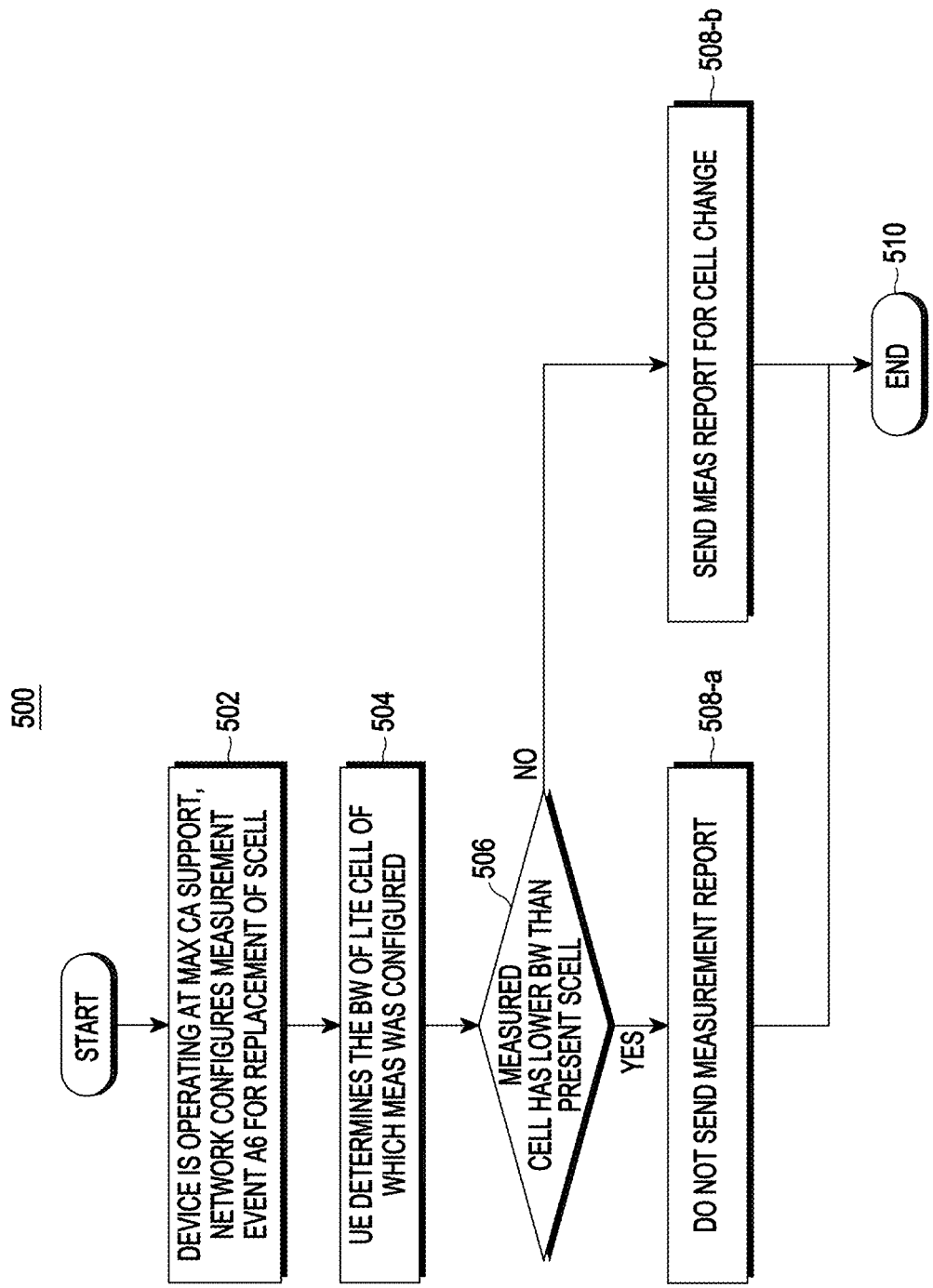
FIG. 5 illustrates an operational flow diagram depicting a process for selecting a combination of cells for higher throughput, in accordance with an embodiment of the present disclosure.

FIG. 5 illustrates an operational flow diagram 500 depicting a process for selecting a combination of cells for higher throughput, in accordance with an embodiment of the present disclosure. In an embodiment, the higher throughput may be related to data transfer between a UE and a network in an EN-DC mode. In an embodiment, the network may configure measurement for an LTE b66 cell (10 MHz) for an LTE CA mode.

$$EN - DC$$
$$DC\_b1 - b5 - n78 \quad = 456 \ Mbps$$
$$BW = 20 + 20 + 20 \ MHz$$

$$LTE - CA$$
$$CA\_b1 - b5 - b66 \quad = 365 \ Mbps$$
$$BW = 20 + 20 + 10 \ MHz$$

At step 502, the process may include configuring by the network, a measurement event A6 for replacement of a present secondary cell (SCell) in the combination of cells configured for the EN-DC mode. In an embodiment, the UE may be operating at maximum CA support (i.e., operating on maximum component carriers).

At step 504, the process includes determining, by the UE, a bandwidth associated with an LTE cell for which the measurement event was configured previously.

At step 506, the process includes determining whether the bandwidth of the measured LTE cell is lower than the bandwidth of the present SCell.

At step 508-a, the process includes avoiding sending the measurement report, where it is determined that the bandwidth of the measured LTE cell is lower than the bandwidth of the present SCell.

At step 508-b, the process includes sending the measurement report for a cell change, upon determining that the bandwidth of the measured LTE cell is higher than the bandwidth of the present SCell.

At step 510, the process may terminate.

Figure 6:
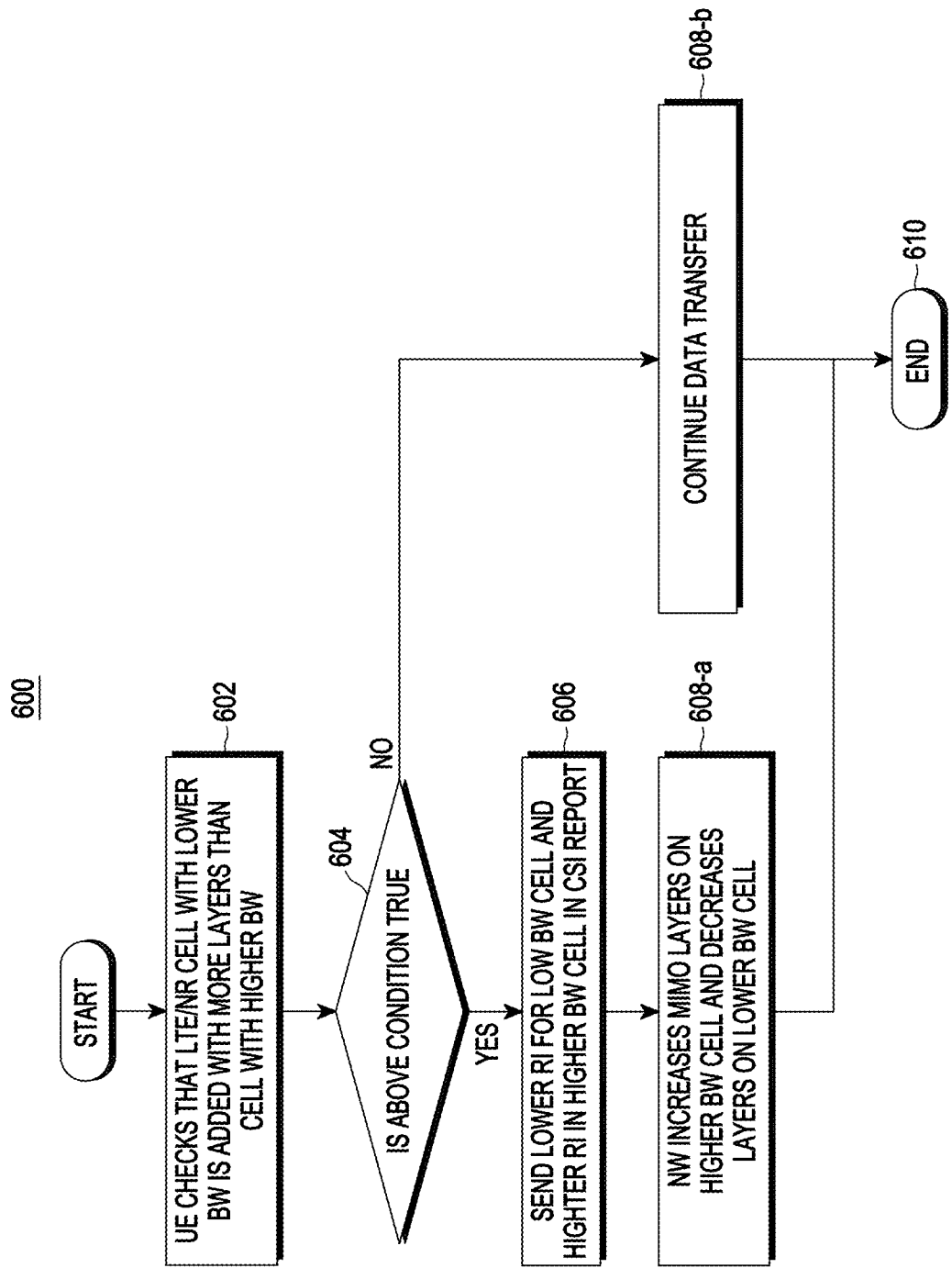
FIG. 6 illustrates an operational flow diagram depicting a process for selecting a combination of cells for higher throughput, in accordance with an embodiment of the present disclosure.

FIG. 6 illustrates an operational flow diagram 600 depicting a process for selecting a combination of cells for higher throughput, in accordance with an embodiment of the present disclosure. In an embodiment, the higher throughput may be related to data transfer between a UE and a network. In an embodiment, the UE may be operating in an EN-DC mode with a different number of MIMO layers assigned on different carriers. In an embodiment, an N78 band with may be operate in 4×4 MIMO (assigned 4 MIMO layers) and a B5 band may operate in 2×2 MIMO (assigned 2 MIMO layers), while the N78 band has a lower bandwidth than the B5 band.

$$EN - DC$$
$$DC\_b1(4\times 4) - b5(2\times 2) - n78(4\times 4) = 574 \text{ Mbps}$$
$$BW = 20 + 20 + 10 \text{ MHz}$$

$$EN - DC$$
$$DC\_b1(4\times 4) - b5(4\times 4) - n78(2\times 2) = 626 \text{ Mbps}$$
$$BW = 20 + 20 + 10 \text{ MHz}$$

At step 602, the process includes checking by the UE whether an LTE/NR cell in the combination of cells has a lower bandwidth but is assigned more MIMO layers than a cell that has a higher bandwidth.

At step 604, the process includes sending a CSI report indicating a lower RI for the cell that has the lower bandwidth and a higher RI for the cell that has the higher bandwidth, upon determining that the LTE/NR cell that has the lower bandwidth is assigned with more layers than the cell that has the higher bandwidth.

At step 606, the process includes increasing by the network, the MIMO layers assigned on the higher bandwidth cell and decreasing the MIMO layers assigned on the lower bandwidth cell in response to the CSI report.

At step 608, the process includes continuing the data transfer upon determining that the LTE/NR cell is not assigned with more layers than the cell that has the higher bandwidth.

At step 610, the process may terminate.

Figure 7:
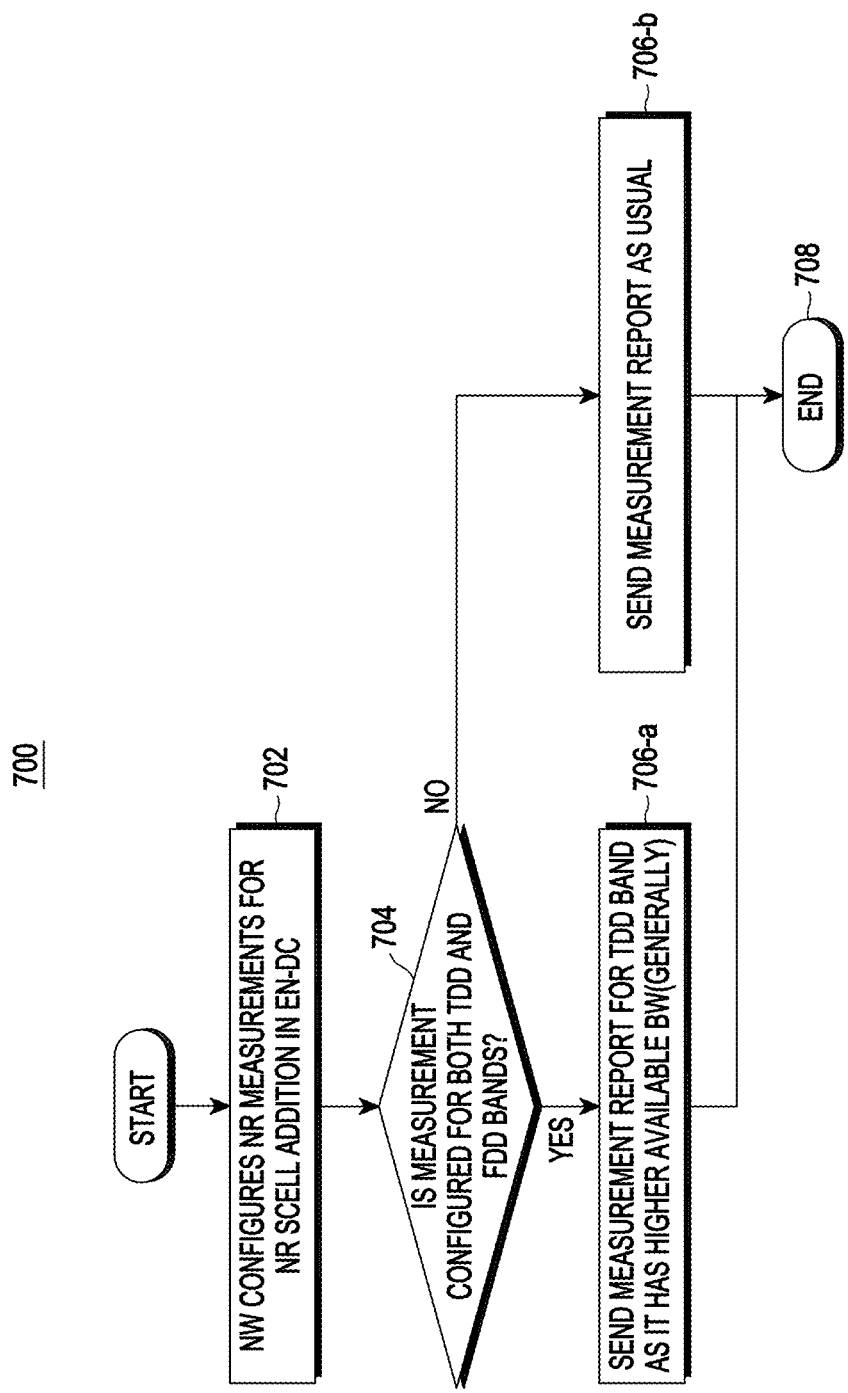
FIG. 7 illustrates an operational flow diagram depicting a process for selecting a combination of cells for higher throughput, in accordance with an embodiment of the present disclosure.

FIG. 7 illustrates an operational flow diagram 700 depicting a process for selecting a combination of cells for higher throughput, in accordance with an embodiment of the present disclosure. In an embodiment, the higher throughput may be related to data transfer between a UE and a network. In an embodiment, the UE may be operating in an LTE connection mode.

$$EN - DC$$
$$DC\_b1 - n5 = 310 \text{ Mbps}$$
$$BW = 20 + 20 \text{ MHz}$$

$$EN - DC$$
$$DC\_b1 - n78 = 916 \text{ Mbps}$$
$$BW = 20 + 100 \text{ MHz}$$

At step 702, the process includes configuring by the network multiple NR measurements for addition of an NR SCell in an EN-DC connection mode.

At step 704, the process includes determining whether the NR measurements are configured for a number of TDD bands and a number of FDD bands.

At step 706-a, the process includes, upon determining that the measurement is configured for both TDD bands and FDD bands, sending the measurement report for the number of TDD bands, based on TDD bands generally having a higher available bandwidth than FDD bands.

At step 706-b, the process includes sending the measurement report as usual upon determining that the measurement is not configured for both TDD bands and FDD bands.

At step 708, the process may terminate.

Figure 8:
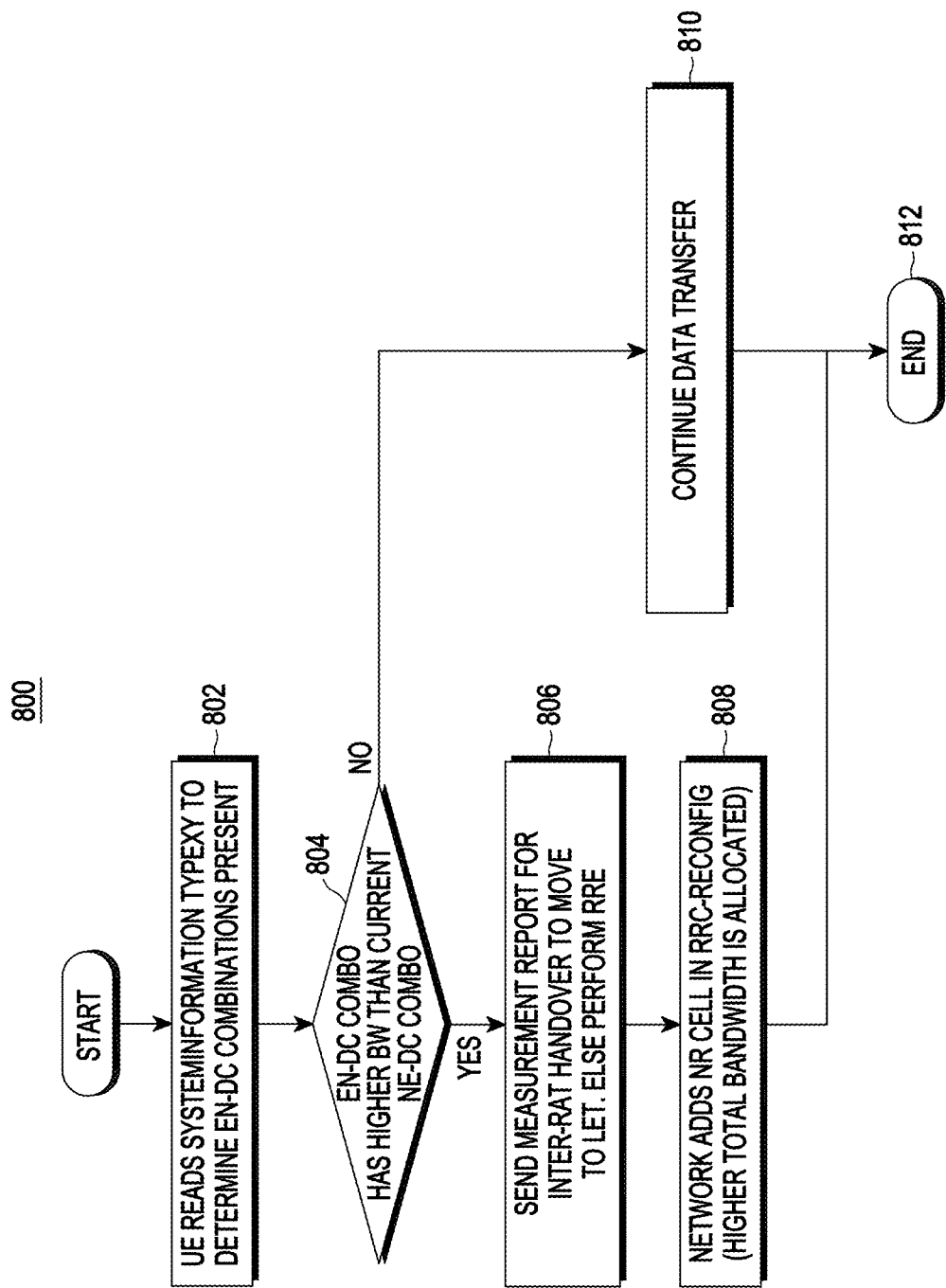
FIG. 8 illustrates an operational flow diagram depicting a process for selecting a combination of cells for higher throughput, in accordance with an embodiment of the present disclosure.

FIG. 8 illustrates an operational flow diagram 800 depicting a process for selecting a combination of cells for higher throughput, in accordance with an embodiment of the present disclosure. In an embodiment, the higher throughput may be related to data transfer between a UE and a network. In an embodiment, the UE may be operating in an NE-DC (limited band combination) mode causing a throughput limitation. In an embodiment, the data may be transferred in the NE-DC mode, and the UE may check a neighboring LTE cell to determine if EN-DC combination of cells are possible.

$$EN - DC$$
$$DC\_n1 - b28 = 572 \text{ Mbps}$$
$$BW = 50 + 20 \text{ MHz}$$

$$EN - DC$$
$$DC\_b3 - n78 = 1022 \text{ Mbps}$$
$$BW = 20 + 100 \text{ MHz}$$

At step 802, the process includes reading a "SystemInformationBlockType26a" associated with the neighboring LTE cell to determine possible EN-DC combinations of cells.

At step 804 the process includes determining whether a possible EN-DC combination has a higher total bandwidth than the NE-DC combination or not.

At step 806, the process includes, upon determining that the possible EN-DC combination has a higher total bandwidth than the NE-DC combination, one of sending a measurement report for an inter-RAT handover to move to the LTE cell, or performing an RRE if a handover is not performed by the network.

At step 808, the process includes adding, by the network, the NR cell in an RRC-Reconfiguration.

At step 810, the process includes continuing data transfer in the NE-DC mode upon determining that the possible EN-DC combination does not have a higher total bandwidth than the NE-DC combination.

At step 812, the process may terminate.

Figure 9:
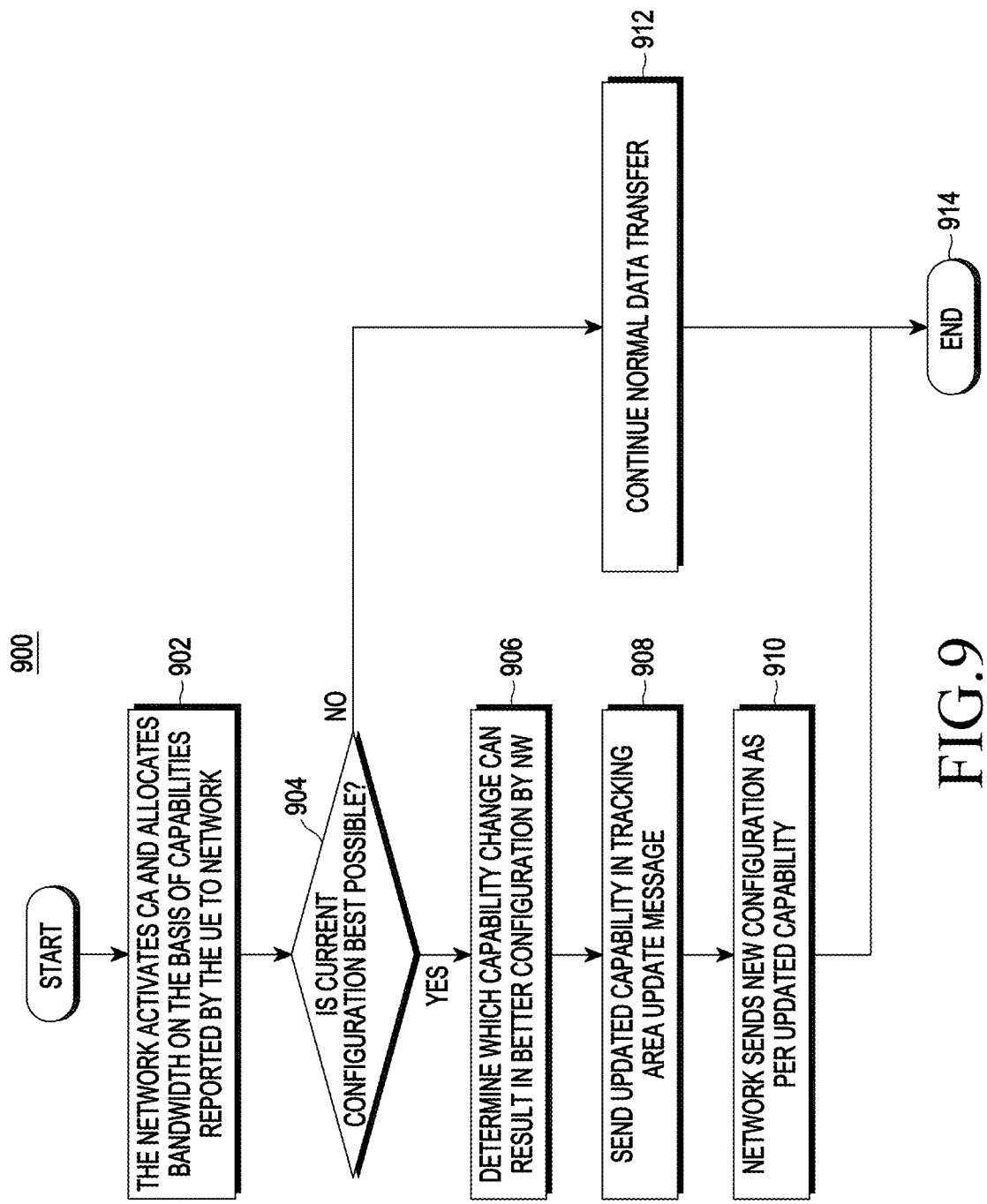
FIG. 9 illustrates an operational flow diagram depicting a process for modifying UE capabilities, in accordance with an embodiment of the present disclosure.

FIG. 9 illustrates an operational flow diagram 900 depicting a process for modifying UE capabilities, in accordance with an embodiment of the present disclosure. In an embodiment, a UE may support two component carriers (CC) at maximum. A data transfer may take place between the UE and a network in EN-DC mode.

$$EN - DC$$
$$DC\_b1 - n66 = 232 \text{ Mbps}$$
$$BW = 20 + 10 \text{ MHz}$$

$$LTE$$
$$CA\_b1 - b5 = 292 \text{ Mbps}$$
$$BW = 20 + 20 \text{ MHz}$$

At step 902, the process includes activating, by a network, CA (e.g., multi-carrier mode) and allocating bandwidth on the basis of capabilities reported by the UE to the network.

At step 904, the process includes determining whether a current configuration (or combination) of a plurality of cells provided by the network for CA is a best configuration for maximum throughput.

At step 906, the process includes, upon determining that the current configuration does not provide the maximum throughput, determining which capability change may result in a better configuration by the network.

At step 908, the process may include sending, by the UE, a TAU message to the network for updating UE capability information. In the TAU message, the UE may set a flag corresponding to a "UE radio capability information update needed flag" based on which the capability information can be updated. The modified capabilities in the UE capability information may include reduced MIMO capabilities on a band that supports lower bandwidths than another available band among the bands of the combination of cells configured by the network, removing support for EN-DC, or removing support for bands that support a lower bandwidth than another available band.

At step 910, the process may include sending, by the network, a new configuration as per the updated UE capability information.

At step 912, the process includes, upon determining that the current configuration does provide the maximum throughput, continuing normal transfer of data.

At step 914, the process may terminate.

Figure 10:
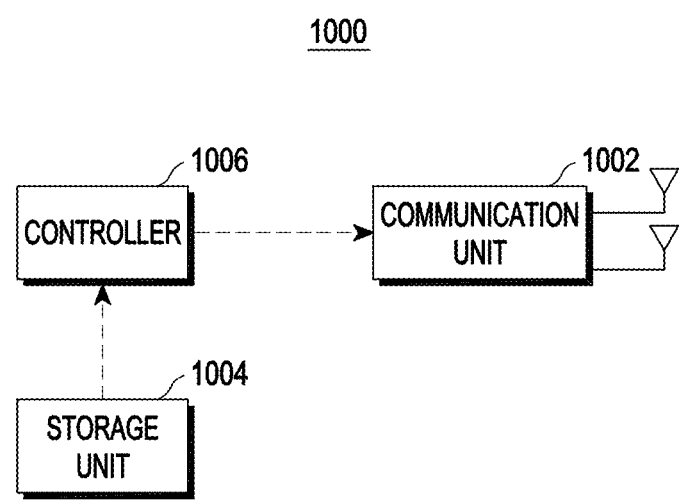
FIG. 10 is a diagram illustrating the configuration of a terminal (or UE) in a wireless communication system according to an embodiment of the present disclosure.

FIG. 10 is a diagram illustrating the configuration of a terminal 1000 in a wireless communication system according to an embodiment of the present disclosure. The configuration of FIG. 6 may be understood as a part of the configuration of the terminal 1000. Hereinafter, it is understood that terms including "unit" or "er" at the end may refer to the unit for processing at least one function or operation and may be implemented in hardware, software, or a combination of hardware and software.

Referring to FIG. 10, the terminal 1000 may include a communication unit 1002 (e.g., communicator or communication interface or transceiver), a storage unit 1004 (e.g., storage), and a controller 1006 (e.g., at least one processor). By way of example, the terminal 1000 may be a User Equipment, such as a cellular phone or other device that communicates over a plurality of cellular networks (such as a 4G, a 5G or pre-5G network or any future wireless communication network).

The storage unit 1004 may store data, such as a basic program, an application program, configuration information, and the like for operating the terminal 1000. The storage unit 1004 may be configured as a volatile memory, a non-volatile memory, or a combination of a volatile memory and a non-volatile memory. In addition, the storage unit 1004 may provide data stored therein in response to a request from the controller 1006. In an example, the storage unit 1004 may store a BW database including bandwidth related to the plurality of cells.

The controller 1006 may control overall operations of the terminal 1000. For example, the controller 1006 may transmit and receive a signal via the communication unit 1002. Further, the controller 1006 records data in the storage unit 1004 and reads the recorded data. The controller 1006 may perform the functions of a protocol stack required by a particular communication standard. To this end, the controller 1006 may include at least one processor or microprocessor or may be a part of the processor. Also, a part of the communication unit 1002 and the controller 1006 may be referred to as a communication processor (CP).

The controller 1006 may be configured to determine a bandwidth associated with each of a plurality of cells upon detecting the plurality of cells present in network. Further, the controller 1006 may be configured to identify at least one combination of cells amongst the plurality of cells for providing a maximum throughput based on the bandwidth associated with each of the plurality of cells. Moving forward, the controller 1006 may be configured to latch onto (or connect to) the combination of cells with the maximum throughput. In an embodiment, the controller 1006 may be configured to determine another combination of cells among the plurality of cells with a throughput less than the maximum throughput, upon failing to determine the at least one combination of cells that has the maximum throughput. For such best combination determination, a ranking of the various combinations is prepared and the best is selected. If there is failure to connect to any one cell from the best combination then the immediately next best ranked combination is selected. In an embodiment, the storage 1004 may be configured to store the bandwidth related to the plurality of cells, the maximum throughput and the throughput related to the at least one combination of cells and the other combination of cells. In an embodiment, the controller 1006 may be configured to scan a number of combinations of the plurality of cells including the at least one combination of the cells and the other combination of cells. In an embodiment, the scanning may be performed based on a throughput related to each combination amongst the number of combinations.

Referring to FIG. 2, the controller 1006 may be configured to acquire bandwidth information and MIMO layer information for each cell of the plurality of cells. In an embodiment, acquiring the bandwidth information may be based on determining that a network may be configuring the UE with a New Radio (NR) cell. Moving forward, in response to determining that the network is configuring the UE with the NR cell, the controller 1006 may be configured to determine a bandwidth related to the NR cell from the plurality of cells being measured by the network.

In an embodiment, the UE may be previously configured with a Long Term Evolution (LTE) cell. Further, in an embodiment, the controller 1006 may be configured to compare the bandwidth related to the NR cell with a bandwidth related to the LTE cell previously configured with the UE. Further, in an embodiment, upon comparing the bandwidth related to the LTE cell with the bandwidth related to the NR cell, the controller 1006 may be configured to send an SCGFailureInfo message through the communication unit 1002 to the network for removal of the NR cell in response to determining that the NR cell is less than the bandwidth associated with the LTE cell.

In an embodiment, the controller 1006 may be configured to determine a result of adding the NR cell. Moving forward, in an embodiment, where it is determined that the addition of the NR cell results in a higher total bandwidth and the maximum throughput, controller 1006 may be configured to send a B1 measurement associated with the NR cell to the network. Further, in an embodiment, where it is determined that the addition of the NR cell results in a lower total bandwidth and a lower throughput, the controller 1006 may be configured to continue with the combination of cells.

In an embodiment, the network may be configuring a measurement event for modification of one or more previously added cells. In an embodiment, the one or more previously added cells may be an LTE cell. Continuing with the above embodiment, the controller 1006 may be configured to determine a bandwidth associated with a cell from the plurality of cells being measured by the network. Moving forward, the controller 1006 may be configured to compare the bandwidth associated with the cell with a bandwidth of the one or more previously added cells.

In an embodiment, the controller 1006 may be configured to determine a result of adding the cell. Moving forward, in an embodiment, where it is determined that the addition of the cell results in a higher total bandwidth and a higher throughput, the controller 1006 may be configured to send a measurement associated with the cell to the network through the communication unit 1002. Further, in an embodiment, where it is determined that the addition of the cell results in a lower total bandwidth and the lower throughput, the controller 1006 may be configured to continue with the combination of cells.

In an embodiment, the UE may be operating in one of an LTE-Cell Aggregation (CA) mode and an ENDC mode. Further, the UE may be configured with maximum number of Multiple In Multiple Out (MIMO) layers. Continuing with above embodiment, the controller 1006 may be configured to determine that a cell amongst the plurality of cells with a lower bandwidth is added with more MIMO layers than the cell with a higher bandwidth. Moving forward, the controller 1006 may be configured to send a Channel Status Information (CSI) to the network through the communication unit 1002.

Further, the CSI report may include the cell with the lower bandwidth at a lower Rank Index (RI) and the cell with the higher bandwidth at a higher RI. Continuing with above embodiment, the network may be configured to increase the MIMO layers on the cell with the higher bandwidth and decrease the MIMO layers on the cell with the lower bandwidth. In an embodiment, the communication unit 1002 may be configured to transfer the data in and EN-DC mode upon addition of the NR cell.

Moving forward, in an embodiment, the UE may be operating in an LTE mode and transferring data to the network. Continuing with the above embodiment, the method 200 may include configuring an NR measurement for addition of an NR cell in EN-DC. In an embodiment, the configuration may be performed by the network. Further, the method 200 may include determining whether the NR measurement is configured for one or more Time Division Duplex (TDD) bands and one or more Frequency Division Duplex (FDD) bands. In an embodiment, the determining may be performed by the controller 1006.

Continuing with the above embodiment, the controller 1006 may be configured to send, by the communication unit 1002, a measurement report to the network for the one or more TDD bands. Furthermore, the measurement report may be sent upon determining that the NR measurement is configured for the one or more TDD bands and the one or more FDD bands. In an embodiment, the determination may be performed by the controller 1006. Upon receiving the measurement report, the network may be configured to add a NR cell associated with the one or more TDD bands.

In an embodiment, the UE may be in an NE-DC mode. Continuing with the above embodiment, the controller 1006 may be configured to determine one or more EN-DC mode combinations of the plurality of cells. In an embodiment, the determination may be performed by the controller 1006 by reading a "SystemInformationBlockType26a". In an embodiment, the "SystemInformationBlockType26a" may be an information block associated with a neighboring LTE cell amongst the plurality of cells.

In an embodiment, the "SystemInformationBlockType26a" may include a NR band list associated with the EN-DC operation upon determining that the one or more EN-DC combinations comprises the higher bandwidth than the previous NE-DC combination. Moving forward, the method 200 may include determining that one or more EN-DC combinations comprises a higher bandwidth than a previous NR-E-UTRA Dual Connectivity (NE-DC) combination. In an embodiment, the determination may be performed by the controller 1006.

Continuing with the above embodiment, the controller 1006 may be configured to perform one or more of sending a measurement report for an inter RAT handover to move to an LTE mode and camping on an LTE cell amongst the plurality of cells with a higher bandwidth by performing a RRC Connection Reestablishment (RRE) if a handover is not performed by the network. In an embodiment, the measurement report may be sent by the communication unit 1002 and the UE may camp on the LTE cell through the controller 1006.

The controller 1006 may be configured to determine calculation of throughput for each cell based on the bandwidth information and the layer information by the controller 1006.

The controller 1006 may be configured to determine a combination of selected cells out of said plurality of cells based on calculated throughput. In an embodiment, information related to the combination of cells determined by the network may be transmitted to the network. In an embodiment, upon receiving the information related to the combination of cells at the communication unit 1002, the controller 1006 may be configured to determine that the combination of cells configured by the network is unable to give the maximum throughput. Upon determining the inability of the combination of cells to give the maximum throughput, the controller 1006 may be configured to send a Tracking Area Update (TAU) request to the network for indicating an update in UE capabilities. In an embodiment, the TAU request may include a flag set to "UE radio capability information update needed flag" by the UE. In response to sending the TAU request to the network, the UE may be configured to receive through the communication unit 1002 an enquiry associated with a UE CA capability from the network in response to sending the TAU request. Upon receiving the enquiry, the controller 1006 may be configured to process the enquiry and send updated UE capabilities to the network through the communication unit 1002. In an embodiment, the updated UE capabilities may include reduced MIMO capabilities on a band supporting lower bandwidths, removing a support for EN-DC, and removing a support for the band with the lower bandwidths.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for selecting a frequency combination for a user equipment (UE), the method comprising:
    determining, by the UE, bandwidth information and multiple-input multiple-output (MIMO) layer information associated with each of a plurality of cells upon detecting the plurality of cells present in a network, wherein the MIMO layer information indicates a number of MIMO layers supported by the UE in a frequency band corresponding to each of the plurality of cells;
    determining, based on the bandwidth information and the MIMO layer information, that a first cell in a combination of cells has more MIMO layers and a lower bandwidth than a second cell in the combination of cells;
    sending a channel status information (CSI) report to the network, wherein the CSI report indicates a lower rank index (RI) for the first cell and the CSI report indicates a higher RI for the second cell;
    identifying, by the UE, at least one combination of cells among the plurality of cells that provides a maximum throughput based on the bandwidth information and the MIMO layer information associated with each of the plurality of cells; and
    connecting, by the UE, to a combination of cells that provides the maximum throughput.

2. The method of claim 1, further comprising:
    determining, by the UE, another combination of cells among the plurality of cells that provides a throughput less than the maximum throughput, upon failing to determine the at least one combination of cells that provides the maximum throughput,
    wherein determining the other combination of cells comprises:
    ranking combinations of cells among the plurality of cells;
    selecting a higher ranked combination among the ranked combinations; and
    selecting a lower ranked combination among the ranked combinations when there is failure to connect to any one cell from the higher ranked combination, wherein the lower ranked combination has a next highest rank among the ranked combinations.

3. The method of claim 1, further comprising:
    acquiring duplexing mode information for each of the plurality of cells; and
    determining the combination of cells based on the duplexing mode information.

4. The method of claim 1, further comprising:
    sending, by the UE to the network, a Tracking Area Update (TAU) request indicating an update in UE capability information, upon determining that a combination of cells configured by the network is unable to provide the maximum throughput;
    receiving, by the UE from the network, an inquiry associated with a UE carrier aggregation capability in response to sending the TAU request; and
    sending, by the UE, updated UE capability information to the network in response to receiving the inquiry from the network.

5. The method of claim 4, wherein, the TAU request comprises a flag set, by the UE, to a UE radio capability information update needed flag.

6. The method of claim 4, wherein the updated UE capability information comprises reduced MIMO capabilities on a band supporting lower bandwidths than another available band among the bands of the combination of cells configured by the network, removing a support for EN-DC, and removing a support for the band supporting the lower bandwidths.

7. The method of claim 1, wherein determining the bandwidth information comprises:
    determining, by the UE, a bandwidth associated with a new radio (NR) cell among the plurality of cells, in response to determining that a B1 measurement of the NR cell is configured by the network, wherein the UE is operating on maximum component carriers;
    comparing, by the UE, the bandwidth associated with the NR cell with a bandwidth associated with a Long Term Evolution (LTE) cell that is part of a previously configured combination of cells for the UE; and
    performing, by the UE, one of:
    sending the B1 measurement associated with the NR cell, upon determining that addition of the NR cell to the previously configured combination of cells in place of the LTE cell would result in a higher total bandwidth and the maximum throughput as compared to the previously configured combination of cells; or
    continuing operation with the previously configured combination of cells, upon determining that the addition of the NR cell to the previously configured combination of cells in place of the LTE cell would result in a lower total bandwidth and a lower throughput as compared to the previously configured combination of cells.

8. The method of claim 1, wherein determining the bandwidth information comprises:
    determining, by the UE, a bandwidth associated with a new radio (NR) cell that is part of a previously configured combination of cells for the UE;
    determining, by the UE, a bandwidth associated with a Long Term Evolution (LTE) cell among the plurality of cells;
    comparing, by the UE, the bandwidth associated with the NR cell with the bandwidth associated with the LTE cell; and
    sending, by the UE, an SCGFailureInfo message to the network for removal of the NR cell in response to determining that the bandwidth of the NR cell is less than the bandwidth associated with the LTE cell.

9. The method of claim 1, wherein determining the bandwidth information further comprises:
    determining, by the UE, a bandwidth associated with a cell among the plurality of cells for which a measurement event is configured by the network, wherein the measurement event is configured by the network for modification of one or more cells that are part of a previously configured combination of cells;
    comparing, by the UE, the bandwidth associated with the cell for which the measurement event is configured with a bandwidth associated with the one or more cells that are part of the previously configured combination of cells;

performing by the UE, one of:
sending, to the network, a measurement associated with the cell for which the measurement event is configured, upon determining that addition of the cell to the previously configured combination of cells in place of the one or more cells that are part of the previously configured combination of cells would result in a higher total bandwidth and a higher throughput as compared to the previously configured combination of cells; and continuing operation with the previously configured combination of cells, upon determining that the addition of the cell for which the measurement event is configured to the previously configured combination of cells in place of the one or more cells that are part of the previously configured combination of cells would result in a lower total bandwidth and a lower throughput as compared to the previously configured combination of cells.

10. The method of claim 9, wherein the one or more previously configured cells are LTE cells.

11. The method of claim 1, wherein the network is configured, in response to the CSI report, to increase the MIMO layers on the second cell and decrease the MIMO layers on the first cell.

12. The method of claim 1, further comprising:
receiving, by the UE from the network, a configuration for a new radio (NR) measurement for addition of an NR cell in an E-UTRAN New Radio-Dual Connectivity (EN-DC) mode, wherein the UE is operating in an LTE mode and transferring data;
determining, by the UE, whether the NR measurement is configured for one or more Time Division Duplex (TDD) bands and one or more Frequency Division Duplex (FDD) bands; and
sending, by the UE to the network, upon determining that the NR measurement is configured for the one or more TDD bands and the one or more FDD bands, a measurement report for the one or more TDD bands.

13. The method of claim 12, wherein the network is configured to add an NR cell associated with the one or more TDD bands upon receiving the measurement report.

14. The method of claim 13, wherein the UE transfers the data in the EN-DC mode upon addition of the NR cell associated with the one or more TDD bands.

15. The method of claim 1, wherein identifying the at least one combination of cells further comprises:
determining, by the UE, one or more E-UTRAN New Radio-Dual Connectivity (EN-DC) mode combinations of cells among the plurality of cells by reading a SystemInformationBlockType26a associated with a neighboring long term evolution (LTE) cell among the plurality of cells;
performing, by the UE, upon determining that the one or more EN-DC mode combinations have a higher bandwidth than a previous NR-E-UTRA Dual Connectivity (NE-DC) combination of cells among the plurality of cells, one or more of:
sending, by the UE, a measurement report for an inter radio access technology (RAT) handover to move to an LTE mode; and
camping, by the UE, on an LTE cell among the plurality of cells that is part of the one or more EN-DC mode combinations that that have a higher bandwidth by performing an RRC Connection Reestablishment (RRE) if a handover is not performed by the network.

16. The method of claim 15, wherein the SystemInformationBlockType26a comprises an NR band list associated with the EN-DC mode.

17. A user equipment (UE) for selecting a frequency combination, the UE comprising:
a communication unit; and
a controller coupled with the communication unit and configured to:
determine bandwidth information and multiple-input multiple-output (MIMO) layer information associated with each of a plurality of cells upon detecting the plurality of cells present in a network, wherein the MIMO layer information indicates a number of MIMO layers supported by the UE in a frequency band corresponding to each of the plurality of cells,
determine, based on the bandwidth information and the MIMO layer information, that a first cell in a combination of cells has more MIMO layers and a lower bandwidth than a second cell in the combination of cells,
send a channel status information (CSI) report to the network, wherein the CSI report indicates a lower rank index (RI) for the first cell and the CSI report indicates a higher RI for the second cell,
identify at least one combination of cells among the plurality of cells that provides a maximum throughput based on the bandwidth information and the MIMO layer information associated with each of the plurality of cells, and
connect to a combination of cells that provides the maximum throughput.

18. The UE of claim 17, wherein the controller is configured to control to:
determine another combination of cells among the plurality of cells that provides a throughput less than the maximum throughput, upon failing to determine the at least one combination of cells that provides the maximum throughput,
wherein the controller is configured to:
rank combinations of cells among the plurality of cells,
select a higher ranked combination among the ranked combinations, and
select a lower ranked combination among the ranked combinations when there is failure to connect to any one cell from the higher ranked combination, wherein the lower ranked combination has a next highest rank among the ranked combinations.

19. A non-transitory computer-readable storage media storing computer-executable instructions that, when executed by a processor of an electronic device, configure the electronic device to perform operations comprising:
determining bandwidth information and multiple-input multiple-output (MIMO) layer information associated with each of a plurality of cells upon detecting the plurality of cells present in a network, wherein the MIMO layer information indicates a number of MIMO layers supported by a user equipment (UE) in a frequency band corresponding to each of the plurality of cells;
determining, based on the bandwidth information and the MIMO layer information, that a first cell in a combination of cells has more MIMO layers and a lower bandwidth than a second cell in the combination of cells;

sending a channel status information (CSI) report to the network, wherein the CSI report indicates a lower rank index (RI) for the first cell and the CSI report indicates a higher RI for the second cell;

identifying at least one combination of cells among the plurality of cells that provides a maximum throughput based on the bandwidth information and the MIMO layer information associated with each of the plurality of cells; and connecting to a combination of cells that provides the maximum throughput.

* * * * *